Figure 1:
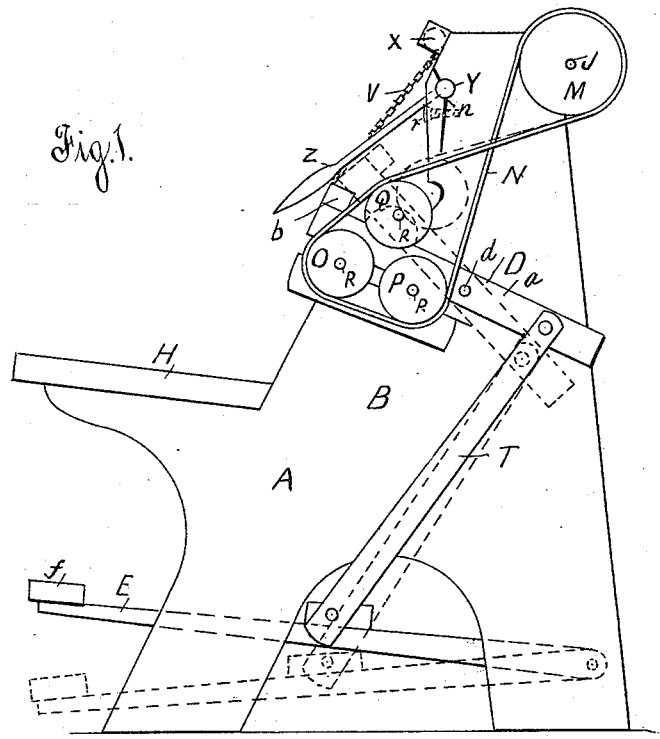

(No Model.) 3 Sheets—Sheet 1.
C. W. GLOVER.
MACHINE FOR FELTING AND SIZING HAT BODIES AND OTHER ARTICLES.
No. 279,376. Patented June 12, 1883.

Witnesses
Wm S Bellows
Frank P Mitchell

C. W. Glover
Inventor
per
Brown Bros.
Attorneys (No Model.) 3 Sheets—Sheet 2.
C. W. GLOVER.
MACHINE FOR FELTING AND SIZING HAT BODIES AND OTHER ARTICLES.
No. 279,376. Patented June 12, 1883.
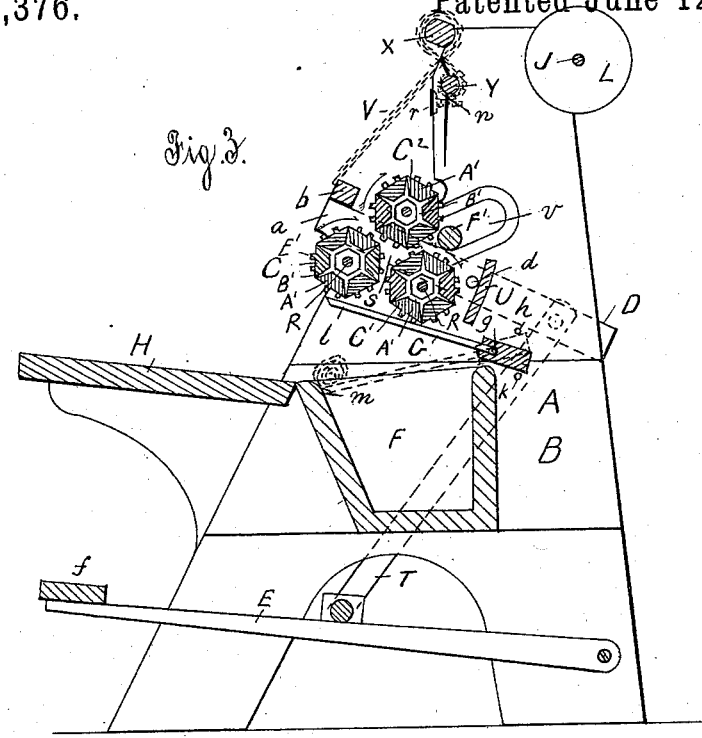
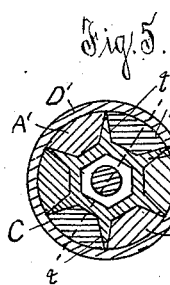
Fig.5.
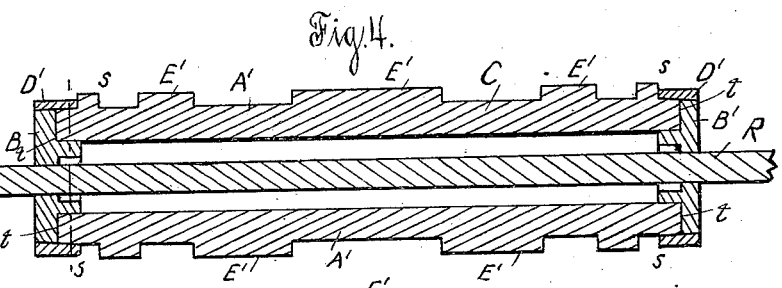
Fig.4.
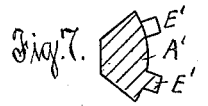
Fig.7.
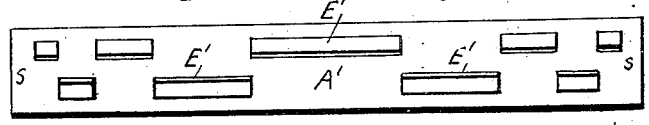
Fig.6.
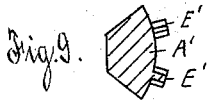
Fig.9.
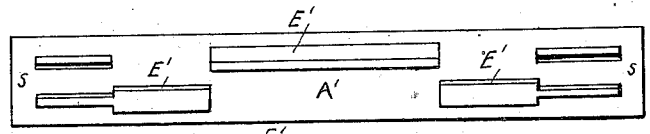
Fig.8.
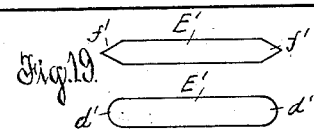
Fig.19.
Witnesses
Wm. S. Bellows
Frank B. Mitchell
C. W. Glover,
Inventor
per Brown Bros.
Attorneys
N. PETERS, Photo-Lithographer, Washington, D. C.

(No Model.) 3 Sheets—Sheet 3.
C. W. GLOVER.
MACHINE FOR FELTING AND SIZING HAT BODIES AND OTHER ARTICLES.
No. 279,376. Patented June 12, 1883.
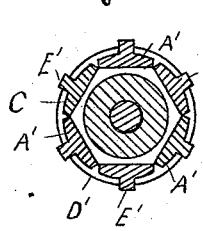
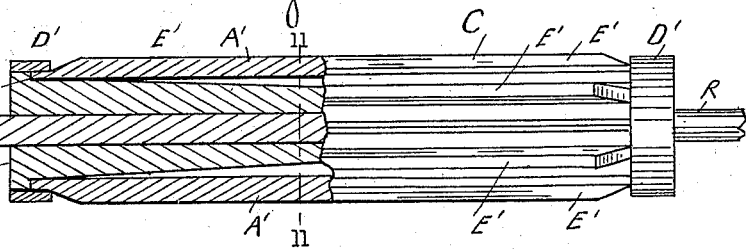
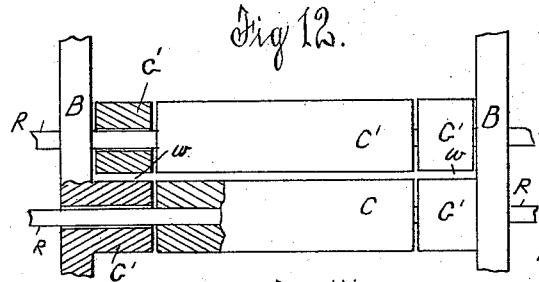
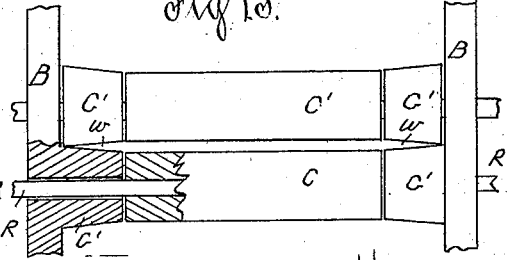
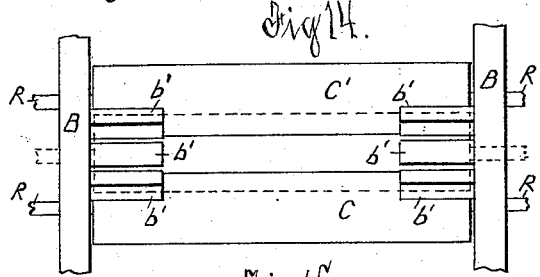
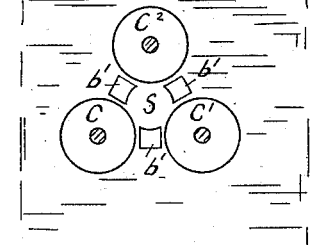
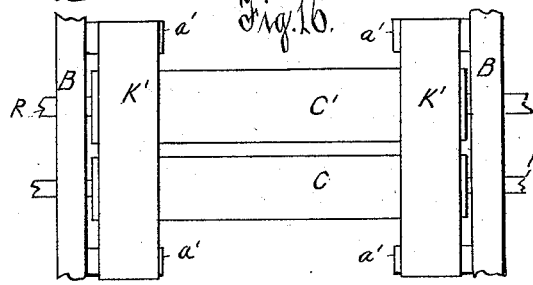
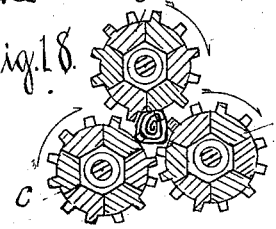
Witnesses
Wm. S. Bellows
Frank P. Mitchell
C. W. Glover
Inventor
per Brown Bros.
Attorneys
N. PETERS, Photo-Lithographer, Washington, D. C.

UNITED STATES PATENT OFFICE.

CARLOS W. GLOVER, OF BOSTON, MASSACHUSETTS.

MACHINE FOR FELTING AND SIZING HAT-BODIES AND OTHER ARTICLES.

SPECIFICATION forming part of Letters Patent No. 279,376, dated June 12, 1883.

Application filed December 19, 1882. (No model.)

*To all whom it may concern:*

Be it known that I, CARLOS W. GLOVER, of Boston, in the county of Suffolk and State of Massachusetts, have invented certain new and useful Improvements in Machines for Felting and Sizing Hat-Bodies and other Articles, of which the following is a full, clear, and exact description.

This invention relates to those machines for sizing or felting hat-bodies and other articles composed of a series of rotating horizontal rollers, (commonly either three or four, but there might be more,) which rollers have their axes parallel, and are arranged to be opened from each other for a roll of hat-bodies or other articles in a sizing-cloth to be placed between and lengthwise of and to be removed from between them, and to be closed upon said roll when it is placed between them, and then for the several rollers to roll and press said roll of hat-bodies, &c., and thereby to size or felt its several hat-bodies, &c., as may be desired. In these machines as generally arranged one portion of the felting-rollers is hung in a stationary frame and the other portion thereof above such rollers and in a swinging or movable frame, arranged to fall and thus to close its roller or rollers upon the rollers of the stationary frame, or, rather, the roll of hat-bodies, &c., placed between the series of rollers, and to be lifted therefrom by the depression of a treadle-lever or other equivalent device suitably connected with it for such operation; and, again, oftentimes the rollers have lags or ribs running lengthwise of them, for their better operation upon the hat-bodies, &c., to felt or size them; and this invention pertains, in part, to the suspension of the falling and rising frame carrying one part of the felting or sizing rollers, and also to the rollers themselves; and, as to such features, the invention consists, first, in a suspension, substantially such as hereinafter described, of the moving frame, carrying one part of the felting-rollers, as above stated, whereby its fall may readily be regulated as may be desired from time to time—of course within given limits—to better adjust the felting roller or rollers carried by it to the thickness of the roll of hat-bodies which is being operated upon; second, in a construction of the felting-rollers in sections or pieces running lengthwise of them, and severally shaped, when put together and secured in place, to make the rollers, and for each section to spring or yield under pressure intermediate of their length, all substantially as hereinafter described; third, in a construction of the felting-rollers with lags or rib projections which run lengthwise of them, and are either shaped or located, or both shaped or located, substantially as hereinafter described, so as to give finer or closer work upon the hat-bodies, &c., at or near each of their ends than at their central portions.

In addition to the above, this invention consists, fourth, in a machine for felting or sizing hat-bodies and other articles, of a frame or rack which is located in position for the roll of hat-bodies, &c., as it is discharged from the felting-rollers, to drop or fall upon it, and is adapted to then swing into a position for said roll to be conveniently removed therefrom without interference with the operation of the felting-rollers, and after such removal to return of itself to its position for receiving the next roll of hat-bodies, &c., falling from the felting-rollers; fifth, in the combination, with the felting-rollers, of a machine for felting or sizing hat-bodies, and other articles of mechanism, which is arranged at either or both ends of the rollers, preferably at both ends, and is constructed so as to operate to retard the rolling movement of roll of hat-bodies, &c., being operated upon by the felting-rollers at either or both ends, as the case may be, of the said roll, all substantially as hereinafter described.

The features above recited are the principal ones making the present invention; but there are other improvements in detail, which will hereinafter fully appear.

Figure 2:
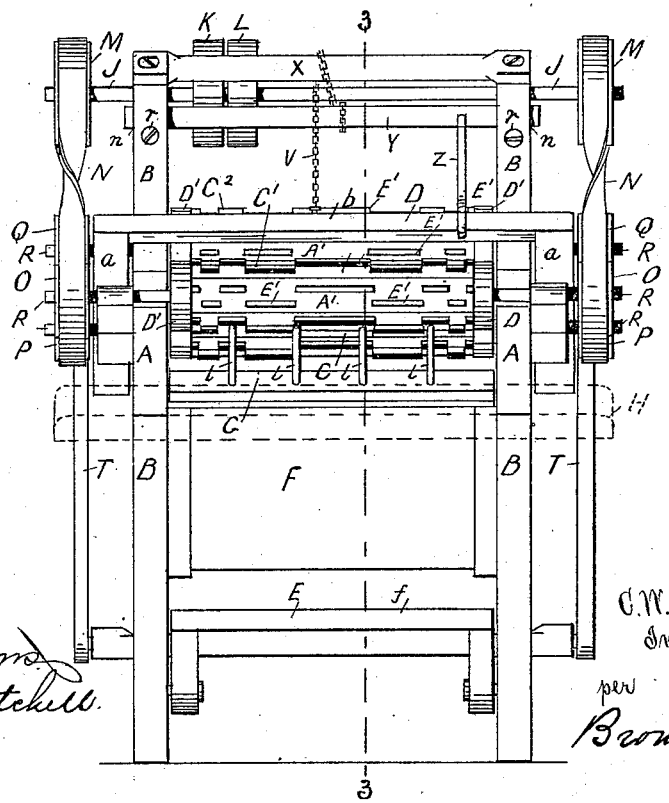

In the accompanying plates of drawings a machine of the present invention is illustrated. In Plate 1, Figure 1 is a side elevation; Fig. 2, a front elevation. In Plate 2, Fig. 3 is a longitudinal vertical section on line 3 3, Fig. 2; Fig. 4, a central longitudinal section of a felting-roller detached, and Fig. 5 a cross-section of same; Figs. 6 and 8, each side views of a detached section of a felting-roller having lags or ribs in accordance with this invention; and Figs. 7 and 9, cross-sectional views of the roller-sections shown in Figs. 6 and 8, respectively. In Plate 3, Fig. 10 is in part a central longitudinal section and in part a side view of a felting-roller, illustrating a modification in its construction to be hereinafter described. Fig. 11 is a cross-section of the felting-roller, Fig. 10, line 11 11. Figs. 12, 13, 14, and 16 are plan views in some parts and horizontal sections in other parts, and Figs. 15 and 17, transverse sectional views of Figs. 14 and 16, respectively, illustrating the feature making the fifth part of this invention, as hereinbefore stated. Fig. 18 is a detail cross-section of the three felting-rollers with a roll of hat-bodies, &c., between them.

In the drawings, A is a stationary framing, composed of parallel side uprights, B, of suitable construction to support the various working parts of the machine, which parts consist, essentially, of three felting-rollers, C, C', and C², a swinging frame, D, carrying the felting-roller C², a treadle, E, connected to said swinging frame D, a stationary tank or tub, F, a swinging rack or frame, G, a working-table, H, and a driving-shaft, J, which has a loose and a fixed pulley, K and L, connected by a belt in any suitable manner with the driving-power, and for such belt to be shifted at pleasure from the loose to the fixed pulley, and vice versa, and which also has a fixed pulley, M, preferably one at each end, each of which pulleys is similarly connected by belt N with pulleys O, P, and Q at each end of the separate shafts R of the several felting-rollers C, C', and C².

The tank F is for holding water, in which are dipped the hat-bodies or other articles which are to be felted or operated on by the machine, and the table H is for the convenient handling and inclosing of the hat-bodies, &c., in a sizing-cloth before placing them under the operation of the felting-rollers, and it is located at the front of the tank, inclining slightly toward the same.

The felting-rollers C and C' are located above the tank F and one alongside of the other, with the roller C, the nearer to the table, a little higher than the other, C', the farther therefrom. The axes of these rollers are horizontal and parallel, and each roller-shaft R turns in stationary bearings of the side uprights, B, and between the two rollers there is an opening or space, S, of sufficient width to permit a roll of hat-bodies, &c., to enter in the said opening and between the rollers, but not to pass through said opening. The other or remaining felting-roller, C², is carried by the swinging frame D, and it is over the rollers C C', turning by its shaft R in fixed bearings of said frame. The axis of the felting-roller C² is horizontal and parallel with the axes of the felting-rollers C and C', and otherwise the felting-roller C² and its carrying swinging frame are arranged so that, lowered to the rollers C and C', it (the roller) will enter into the space S between the peripheries of said rollers and rest upon the upper side of the roll of hat-bodies, &c., placed between the lower felting-rollers, C and C'. The construction of the felting-rollers C, C', and C² will be hereinafter particularly described.

The swinging frame D is composed of two parallel side arms, a a, joined by the shaft R of the felting-roller C², and by a cross-bar, b, at the front of the side uprights, B, and said side arms are outside of the uprights B, and each is pivoted thereto, as at d, all so that the frame, if not retained in any way, is of itself free to swing downward toward the felting-rollers C and C', having bearings in the side uprights, and thereby place the felting-roller C² into operating position upon the roll of hat-bodies, &c., between said felting-rollers, as will hereinafter more fully appear.

T is a rod at each side of the swinging frame D, and connecting it to the treadle-frame E, located in the lower part of the stationary framing A, and hung to the side uprights, all so that a depression of the front end, f, of the treadle-frame E swings the front end of the swinging frame D upward, lifting the felting-roller C², and thus placing it out of its operating position upon the roll of hat-bodies, &c., between the felting-rollers C, C', and C², before referred to.

The pulley-wheels O, P, and Q of the several felting-rollers are of the same diameter, and the belt N, for driving them, is arranged so as to turn them all, and through them the felting-rollers, and all in one and the same direction, as represented by arrows in the drawings, Fig. 3. Again, the swing of the frame D, carrying the felting-roller C², and the location of said roller thereon, are to be such that in whatever position, whether the roller be in or out of operating position upon the roll of hat-bodies, &c., between the felting-rollers C C' C², there will be no stopping of the running of the belt N, and the uniform driving and direction of rotation of the felting-rollers always secured.

The rack or frame G is located below the two lower felting-rollers and projects beyond the rear roller of the two. The rack G, at its rear portion, g, swings upon the side uprights, and otherwise it is arranged and weighted of itself, if not otherwise restrained, to swing upward toward the under side of the felting-rollers, and in such position to receive a roll of hat-bodies, &c., falling from the rear side of the felting-rollers C', preferably from the additional weight of such roll of hat-bodies, &c., upon and of itself to be capable of then swinging into position to place its forward or front portion into position for such roll of hat-bodies, &c., to pass down over the same toward the table H and into a convenient position for removal by the operator without danger of interference in any way with the running of the felting-rollers.

h is a stop or abutment limiting the downward swing, and k is a stop or abutment limiting the upward swing of the rack or frame G. The forward portion of this rack preferably is made of arms $l$, running toward the operator, so that the roll of hat-bodies, &c., can freely roll forward upon the frame G, and these arms are of a length to come to a rest against the forward side, $m$, of the tank F, when the frame G swings downward, and thus hold said roll against escape from the rack into the tank.

U is a vertical guard or partition located behind the rear lower felting-roller, C', and at a suitable distance therefrom for the roll of hat-bodies, &c., to pass downward at the rear of said felting-roller to the rack, and otherwise it acts to guard and guide said roll in its said passage over the rear side of the said felting-roller C' directly to said rack, as has been described, and preventing all possibility of the roll passing in any direction other than that desired.

V is a chain fastened to front rail, $b$, of swinging frame D, carrying the felting-roller $C^2$, and from thence passing upward round a fixed horizontal rail, X, of the frame A to a horizontal shaft, Y, which is arranged below said rail X, and to which said chain is also fastened. This shaft Y turns in frictional bearings $n$ of the side uprights, and has a handle, Z, for convenience in turning it. The friction of these bearings upon the shaft Y is sufficient to hold said shaft against turning either accidentally or from the weight of the swinging frame D and its parts and its connection with said shaft, as above described, but to allow the shaft to be turned by the operator through the leverage of the handle-lever Z.

$r$ are screws for setting up or loosening the frictional bearings $n$ of the shaft Y to adjust same, as may be desired. This suspension of the swinging frame D enables it to be raised or lowered, and thus its felting-roller $C^2$ to be raised or lowered, independent of its being raised or lowered with its roller from the operation of the treadle hereinbefore described.

The body of each of the felting-rollers in accordance with this invention, so far as it pertains to the construction of the rollers, is in sectional pieces A', each running the length of the roller, and these several sectional pieces at each end $s$ enter sockets or recesses $t$ in head or end plates, B', that are secured to the roller-shaft in any suitable manner, so as to turn as one therewith. The roller-sections A' and head-pieces B' and their roller-shafts are shown in Figs. 4, 5, 6, 7, 8, 9, 10, and 11, and, as there shown, the ends of the several sections or pieces A' of each roller C C' $C^2$ are held in their respective heads B' against outward escape therefrom by a ring, D', encircling each head-piece and the ends of the several sections of the roller entering the same. This ring D is secured to the head-piece in any suitable manner—as, for instance, by fastening-screws passing through it on the head-piece, or by being made screw-threaded and screwing it over the head-piece, also made screw-threaded to receive it. Each ring D' and its head-piece B' could be, however, in one piece, and the ends of the sections inserted in the sockets or recesses and the head-pieces then secured to the shaft.

The sectional pieces A' of each roller C, C', and $C^2$ are unconfined, except at their ends $s$, as has been described, and interiorly they are shaped, as also the shaft passing through the roller from end to end, (see Figs. 4 and 5, 10 and 11,) to spring or yield in their length and between their said confined ends when the rolls are in operation.

The rollers preferably are provided with parallel lags or ribs E', running along their length. Under the present invention the lags are constructed and arranged in lines, so as to be more in number and to present smaller working-surfaces at or near the ends of the rollers than at the intermediate or central portions thereof, which is secured by making the lags shorter or narrower at or near the ends than at the central portions of said rollers. This construction and arrangement are illustrated in the drawings in two forms, both, however, practically the same. (See Fig. 4, 6, and 7, and 8 and 9, more particularly.) As shown in Figs. 4, 6, and 7, which are different views of the same, the lags are of uniform width, but are longer at the central portion of the roller, and therefore present a greater length of working-surface of the roller at said central portion, and are shorter and thus present less length of working-surface toward or at or near the ends of said roller. As shown in Figs. 8 and 9, which are of the same sections of a roller, the lags have a less width and are more in number at or near the ends of the roller than at its central portion thereof. Thus in both instances the lags are more in number and less in working-surface at or near the ends than at the central portion of said roller.

The lags can be of any length or width desired, and also need not be arranged in the same longitudinal line as shown, so long as they increase in number and diminish in working-surface from the central portion of the roller toward its ends. The ends of the lags are cut square; but, in lieu of so cutting them, they can be cut in any form desired—that is, round or diamond-pointed, as shown at $d'$ and $f'$, Fig. 19, which are front views of a lag detached from its roller. In some cases it might be desirable to so cut the lags.

In the use of the machine above described the hat-bodies, &c., to be felted or sized are rolled up into a roll, in the usual way, in a sizing-cloth and placed into the open space S, between the lower felting-rollers, C C', (the upper felting-roller, $C^2$, being first lifted through the treadle,) and the upper felting-roller is then dropped upon said roll and there allowed to remain. In this position of the felting-rollers and of the hat-roll the felting and sizing of the hat-bodies making up the roll proceeds as usual, and when completed the upper felting-roller is lifted, and the hat-roll, then passing over the rear of the rear felting-roller, drops upon the rack, which then, tilting under the weight of the hat-roll, secures the rolling of the hat-roll toward the operator into position to be conveniently removed by him without danger of interference with the running of the felting-rollers, which during the meantime may have been furnished with another hat-roll and the upper felting-roller placed in operating position with the lower felting-rollers. As the rear roller of the under felting-roller is lower than the front roller, the rotation of the rollers has a tendency to throw the hat-roll out of its position between the two rollers before the upper felting-roller, C², is brought down upon it. To prevent this, if thought necessary, a roller, F', rests upon the hat-roll, and is suspended at each end in loose guideways $v$ of the side uprights, so as to be free to move away as the upper felting-roller comes into operating position. However, this roller F' may be dispensed with, and, even if used, when the upper felting-roller is lifted, the hat-roll, from the rolling movement which it has acquired in felting its hat-bodies between the several rotating rollers, of itself will prevent its obstructing its escape from the lower felting-rollers and passage over the back of the rear felting-roller, C', to the rack G below, to be by it delivered to the operator, as has been before described. By this operation of parts it is plain that the operator can handle work with greater rapidity, for the reason that when a hat-roll has been sufficiently felted its discharge from the machine is automatic, and as a consequence the operator has only then to see to the placing of another hat-roll in the machine and bringing the upper felting-roller into operating position, which being done, he can then, at his leisure during the then felting of such hat-roll, remove the hat-roll previously felted and discharged from the rack G, upon which it was received, as has been stated.

As well known in felting hat-bodies, &c., sometimes less pressure of the upper felting roller or rollers is required than at other times, because of variation in the size of the hat-bodies and other well-known reasons. In this machine the suspension of the upper felting-roller, C², as has been described, through the chain V, rail X, and shaft Y, enables the pressure of upper felting-roller to be varied most readily and easily, as is obvious, and without interference with the usual operation of the swinging frame D, carrying said upper felting-roller, C².

In rolls of hat-bodies, as well known, when made up to be felted, as described, some of the hat-bodies overlap others, and as a consequence the rolls are thinner or of a smaller dimension at the end portions than at the central portion, and are required to be worked upon finer by the felting-rollers at the end portions than at the central portion. The arrangement and construction of the roller-lags herein described secure this difference of work upon said different portions of the hat-bodies in the most effective manner, as is plain without further explanation. In Figs. 10 and 11 the lags are shown as extending on its section from end to end of the roller.

The making of the felting-rollers in sections and the arrangement of the sections described allow, as before observed, the rollers to yield or give in their pressure upon the hat-rolls being felted, which would not be the case were the rollers whole or in one piece, and which, as is apparent, is advantageous in the felting operation. Again, as felting-rollers are most always and by preference made of wood, if wood is used, then, by making the rollers in sections, the wood can be used with the greatest economy and practicability, and the lags can be formed with them directly from the wood itself making the sections, thus obviating the use of fastening-screws or other fastening devices. Lags E' of the present improved construction and arrangement are capable of use upon rollers either made solid or in sections, and the making of the rollers in sections is, as is obvious, not dependent upon any particular arrangement or construction of the lags.

The rail X and shaft Y preferably should each be made of a size in relation to their length, and according to the material of which they are made, for them to yield sufficiently to relieve the fall of the swinging frame D.

In Figs. 12 to 17, inclusive, each felting-roller C C' C² is shown as provided at each end with mechanism for retarding the rolling movement of the hat-roll being felted under the rotation of the rollers, which in each instance is carried by its shaft R, and otherwise arranged to be rotated as before described. This arrangement of mechanism is in accordance with the fifth division of the present invention, as hereinbefore stated, and in Figs. 12 and 13 the mechanism consists of a collar, G', at each end of the roller, which collars have a space, $w$, between them, as to the several rollers, so that the ends of the hat-rollers, as the hat-roll is being rolled by the rotation of the central portions of the felting-rollers, will be dragged between them and thus retarded, causing a twisting and tightening of the ends of the hat-bodies making up the hat-roll and preventing the longitudinal extension of the hat-roll. These collars may be stationary or adapted to turn either upon the carrying-shafts R of the felting-rollers upon suitable supports of the side upright, as shown, and, as shown in Fig. 12, have the space $w$ between them of equal width throughout its whole length, or tapering outwardly from the ends of the rotating rollers, as shown in Fig. 13.

In Figs. 14 and 15 the mechanism consists of arms $b'$, carried by the side uprights and projecting into the open space S between the felting-rollers, and arranged for the ends of the hat-body to drag between them and the peripheries of the rollers as the rollers rotate.

These arms may be stationary or arranged to rotate from the drag of the hat-roll between them and the felting-rollers.

In Figs. 16 and 17 the mechanism consists of a flat strip or belt, K', of flexible material—such as cloth—located at each end of the felting-rollers, and secured at their ends to arms a' of the upright, and passing from front to rear of the same between the upper and lower rollers, and thus make a drag upon the ends of the hat-roll being felted between the felting-rollers.

The belt N need not be crossed, as shown, but straight; but in such case the driving-shaft J, with its pulley M, should be lower down in relation to the felting-rollers.

Having thus described my invention, what I claim, and desire to secure by Letters Patent, is—

1. In a machine for felting hat-bodies and other articles, a felting-roller made in longitudinal sections secured at each end and to the shaft, substantially as and for the purpose described.

2. In a machine for felting hat-bodies and other articles, a felting-roller made with lags, located longitudinally upon the roller, substantially as and for the purpose described.

3. In a machine for felting hat-bodies and other articles, a felting-roller made with lags, constructed and arranged in relation to the roller so that said lags are smaller and more in number at or toward the ends than at the central portion of said roller, for the purpose specified.

4. In a machine for felting hat-bodies and other articles, a felting-roller made in longitudinal sections, and each section provided with lags constructed and arranged and the several sections secured at each end to the shaft substantially as described, for the purpose specified.

5. In a machine for felting hat-bodies and other articles, a swinging frame, D, carrying a felting roller or rollers, in combination with a chain, V, and roller Y, substantially as and for the purpose specified.

6. In a machine for felting hat-bodies and other articles, a swinging frame, D, carrying a felting roller or rollers, in combination with a chain, V, roller Y, and bar X, substantially as and for the purpose specified.

7. In a machine for felting hat-bodies and other articles, the combination, with felting-rollers, of a rack or frame, G, for receiving the hat-bodies, &c., as they drop from the felting-rollers, substantially as and for the purpose specified.

8. In a machine for felting hat-bodies and other articles, the combination, with felting-rollers, of mechanism at the ends thereof, substantially such as described, for retarding the rolling movement at the ends of the hat-bodies being operated upon by the felting-rollers, substantially as and for the purpose described.

In testimony whereof I have hereunto set my hand in the presence of two subscribing witnesses.

CARLOS W. GLOVER.

Witnesses:
EDWIN W. BROWN.
WM. S. BELLOWS.